United States Patent [19]

Greer

[11] 4,068,684
[45] Jan. 17, 1978

[54] LOCKING RING ASSEMBLY FOR THE LIQUID PORT OF A PRESSURE ACCUMULATOR

[76] Inventor: Edward M. Greer, 820 Loma Vista Drive, Beverly Hills, Calif. 90210

[21] Appl. No.: 725,491

[22] Filed: Sept. 22, 1976

Related U.S. Application Data

[63] Continuation of Ser. No. 603,339, Aug. 11, 1975, abandoned, which is a continuation-in-part of Ser. No. 585,034, June 9, 1975, abandoned.

[51] Int. Cl.² ............................................. F16L 55/00
[52] U.S. Cl. ................................................... 138/30
[58] Field of Search .................... 138/26, 30; 277/137, 277/178

[56] References Cited

U.S. PATENT DOCUMENTS

| | | | |
|---|---|---|---|
| 1,671,526 | 5/1928 | Gilmer | 277/137 |
| 2,029,072 | 1/1936 | Hughes | 277/137 X |
| 3,439,924 | 4/1969 | Ludewig et al. | 277/137 |
| 3,493,236 | 2/1970 | Kleindienst | 277/178 |
| 3,537,481 | 11/1970 | Mercier | 138/30 |
| 3,784,237 | 1/1974 | Zirps | 138/30 X |

*Primary Examiner*—Richard E. Aegerter
*Assistant Examiner*—James E. Bryant, III
*Attorney, Agent, or Firm*—Jessup & Beecher

[57] ABSTRACT

A locking ring assembly is provided for releasably retaining a tubular valve housing in the liquid port of a bladder-type pressure accumulator without any possibility of the valve housing being blown out from the port when a normal high pressures are attained within the accumulator shell. The locking ring assembly seats at an angle against an identical angle on the inside of the opening at the mouth of the accumulator shell so that when excessively high internal pressures are reached within the shell the ring will force the mouth of the shell to expand diametrically forcing the mouth open thus extruding an O-ring seal which releases the pressure. Thus the accumulator shell cannot burst.

2 Claims, 6 Drawing Figures

LOCKING RING ASSEMBLY FOR THE LIQUID PORT OF A PRESSURE ACCUMULATOR

This is a continuation of Copending Application Ser. No. 603,339 filed Aug. 11, 1975, now abandoned, which, in turn is a continuation-in-part of Application Ser. No. 585,034 filed June 9, 1975, now abandoned.

BACKGROUND OF THE INVENTION

Pressure accumulators are widely used in many types of hydraulic systems. One type of pressure accumulator comprises a thimble-shaped flexible bladder mounted in a rigid housing, and which serves to separate the interior of the housing into two separate compartments which are sealed from one another. A "liquid" port is provided at one end of the housing which communicates with one of the compartments, termed the "liquid" compartment; and a valved "gas" port is provided at the other end of the housing which communicates with the other compartment, termed the "gas" compartment.

A compressible gas, such as nitrogen, is permanently charged and compressed under high pressure and sealed through the valved gas port into the gas compartment of the accumulator. Then, an incompressible hydraulic liquid under high pressure is pumped through the liquid port into the liquid compartment. The flexible bladder is gradually forced into the gas compartment as the liquid is pumped into the liquid compartment, thereby compressing the gas in the gas compartment until a balanced high pressure is reached in both compartments. In this way, energy is stored or absorbed into the gas compartment of the accumulator, and this energy acts as a spring to force the incompressible hydraulic liquid out through the liquid port, thereby causing the hydraulic liquid to do useful work.

It is the usual practice to provide a spring loaded poppet in the liquid port of the accumulator to prevent the bladder from extruding out of the accumulator. Under normal operation this poppet valve is held open by the spring and is closed by the action of the bladder impinging upon the poppet after all of the liquid is expelled from the liquid compartment thus preventing the gas pressure from forcing the bladder out of the liquid port.

Problems have been encountered in the prior art in providing an appropriate mounting structure for the poppet valve assembly in the liquid port. It is undesirable merely to thread the housing into the liquid port, in that the threads may become worn and stripped with the likelihood of blowing out of the valve assembly when high pressures are attained within the container, which could cause severe injury.

Various types of retainers for the valve assembly have been suggested in the prior art. For example, Mercier Pat. No. 2,801,067 discloses one type of closure valve for the oil port of a pressure accumulator which includes a tubular housing which is retained in the liquid port by means of a deformable locking ring which engages a shoulder on the housing, and which also engages the inner lip of the liquid port. A subsequent U.S. Pat. No. 3,439,712 of Mercier shows another locking arrangement in which rigid arcuate segments are used to define a locking ring to engage the shoulder on the tubular valve housing and also to engage the lip of the liquid port, and which also includes a ring of resilient material bond to the top surfaces of the annular segments and extending outwardly around the lip of the liquid port.

Another Mercier U.S. Pat. No. 3,148,705 shows a locking ring assembly similar in some respects to the arrangement described in the preceding paragraph, but one in which the segments are shaped to extend into an annular recess in the resilient ring, so that the assembly may be held in place without the necessity for bonding the ring to the annular segments.

The assembly of the present invention is of the same general type described in the Mercier U.S. Pat. No. 3,148,705, in that a resilient ring is held assembled to the arcuate segments without bonding. However, this is achieved in the assembly of the present invention in a improved and more simplified manner.

DETAILED DESCRIPTION OF THE ILLUSTRATED EMBODIMENTS

Figure 1:
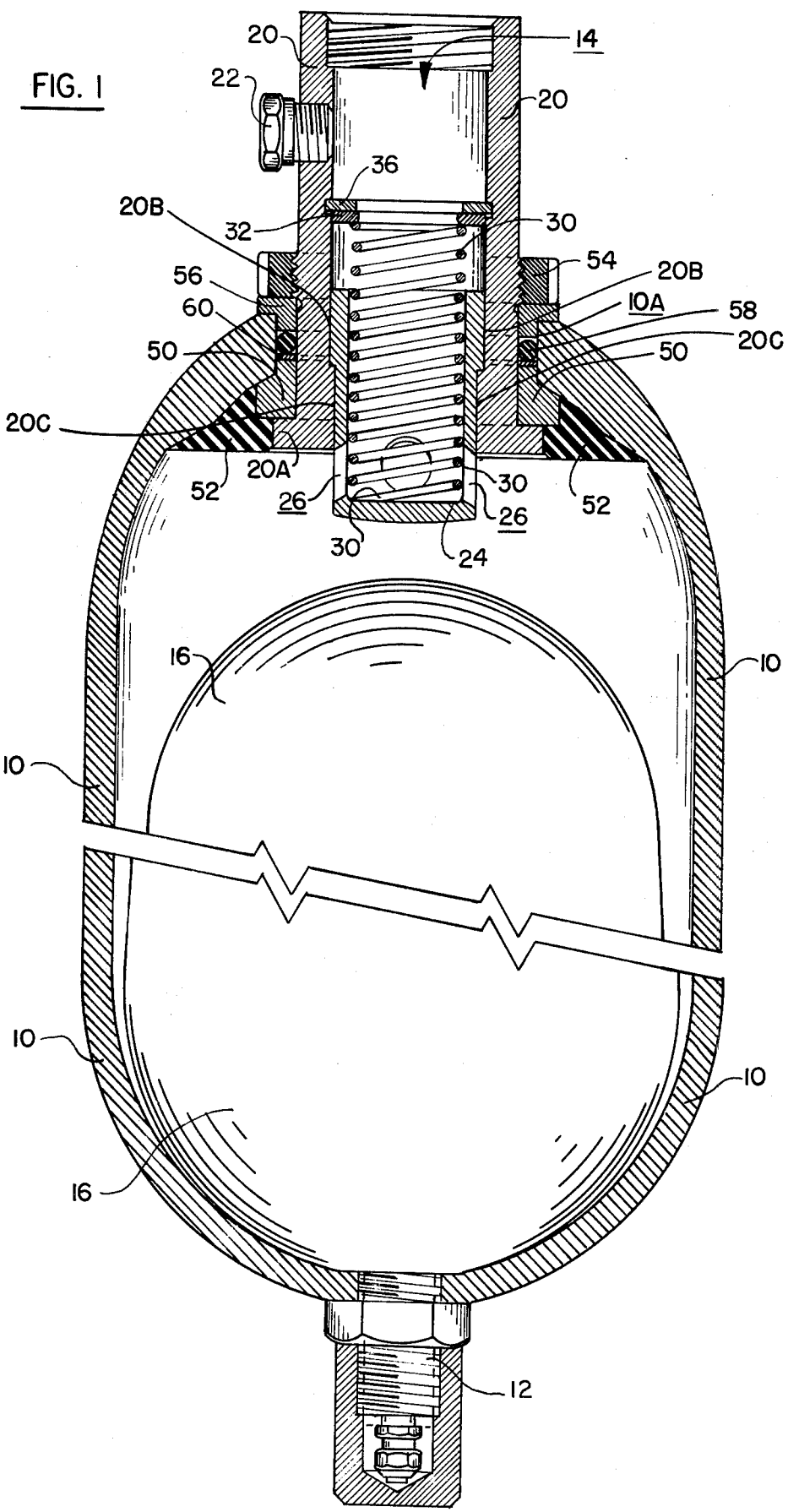
FIG. 1 is a side section showing one embodiment of the invention in an assembled condition.

The pressure accumulator shown in FIG. 1 includes a rigid shell 10 having a valved gas port 12 at one end, and a liquid port 14 at its other end. A thimble-shaped flexible bladder 16 is supported within the shell 10 in a manner well understood in the art. The valve assembly of the present invention is mounted in the liquid port 14, and it includes a tubular valve housing 20 having an outer diameter less than the diameter of the opening 10A in the shell 10, and having a flange 20A formed at its inner end which forms a shoulder, and whose outer diameter is also less than the diameter of the opening 10A of the container. A plug 22 may be threaded into the wall of the housing 20 adjacent the open outer end of the housing.

The tubular poppet valve 20 is slidably mounted in the tubular housing 20. The tubular valve member 24 has an end wall enclosing its outer end, and a plurality of openings 26 are provided in the wall of the tubular member 24 adjacent its inner end, these openings being exposed to the interior of the shell 10 when the valve member 24 is in its outer extended position, as shown in FIG. 1.

The tubular valve housing 20 contains two concentric internal diameters 20B for the larger, and 20C for the smaller. Into these internal bores is fitted a tubular poppet valve 24 having mating diameters to form a concentric arrangement so that the poppet valve 24 cannot cock. The poppet 24 contains an end wall at one end which prevents extrusion of the bladder 16, since it provides a surface against which the bladder 16 can push the poppet 24 closed when the bladder is distended. A plurality of openings 26 around the periphery of the poppet valve 24 adjacent its end wall allows for the communication of oil from the inside of the shell 10 through the port 14 when the valve is in its normal open position.

The inner surface of the tubular member 20 and the outer surface of the valve member 24 have mating longitudinal sections of increased diameter, as shown, so that the valve 24 may slide freely within the tubular housing 20 without cocking, and so as to provide appropriate shoulders to limit the inward travel of the valve member 24.

A coil spring 30 is mounted coaxially within the tubular member 24, and one end of the spring 30 engages the end wall of the tubular valve member. The other end of the spring 30 engages a washer 32 which is held in place by a usual split ring 36.

It will be evident that so long as the valve 24 is in the position illustrated in FIG. 1, the oil may flow freely through the liquid port 14, through the openings 26, and through the interiors of the tubular members 20 and 24 and through the open end of the tubular valve housing 20. However, when the flexible bladder 16 is distended to the right-hand end of the container, it moves against the end wall of the poppet valve 24, and closes the valve, so as to prevent extrusion of the bladder through the port 14.

As mentioned above, high pressures are developed within the shell 10, and unless appropriate means are provided to hold the valve housing 20 within the opening 10A, severe damage and injury could occur. The present invention, in another of its aspects, provides an improved and simple means whereby the various elements of the valve assembly may easily be mounted in the liquid port, and may be just as easily disassembled if so desired. However, when the valve assembly is mounted in the liquid port 14 by the retaining elements to be described, it is positively and securely held in the liquid port, and any likelihood of its being ejected through the liquid port for normal internal shell pressures is obviated; and yet the assembly will be ejected should the internal pressure reach such excessively high values as would otherwise burst the shell.

Figure 2:
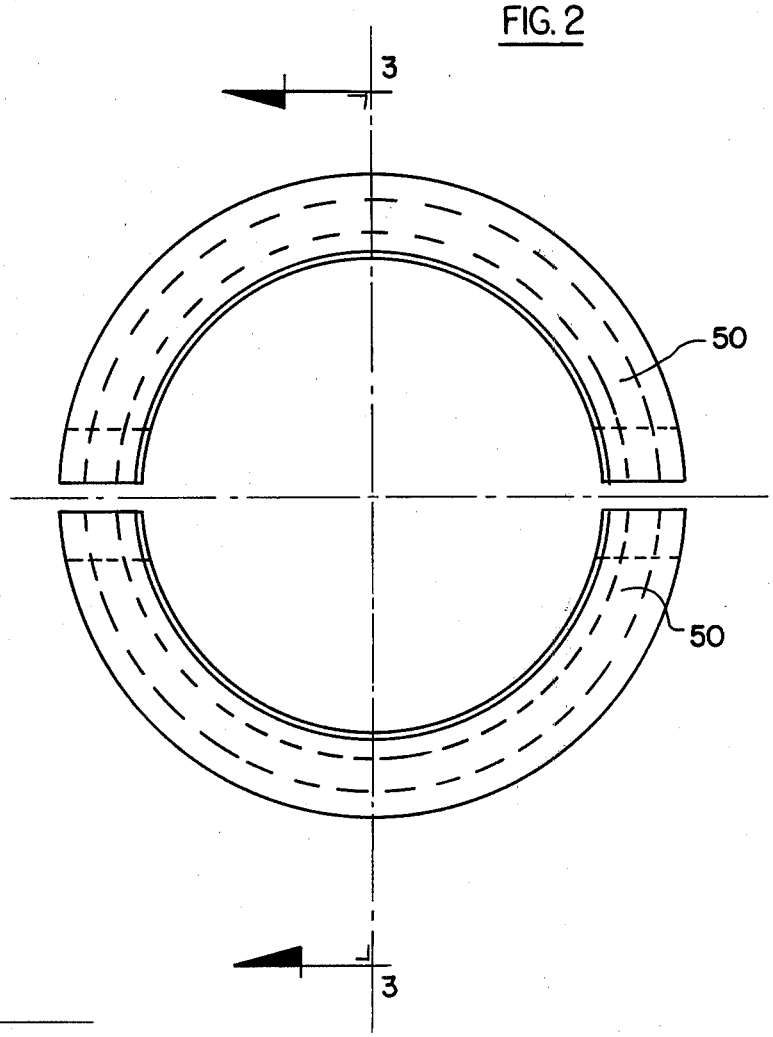
FIG. 2 is a plan view of a retaining ring used in the assembly of FIG. 1, which in turn, is made up of a plurality of arcuate segments.
Figure 3:
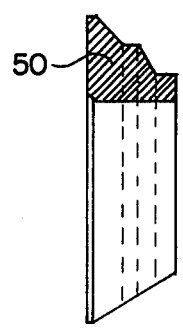
FIG. 3 is a section of the retaining ring of FIG. 2 taken along the line 3—3 of FIG. 1.
Figure 3:
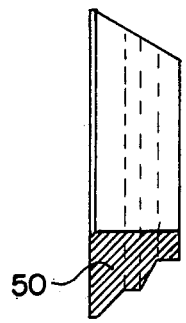
Figure 4:
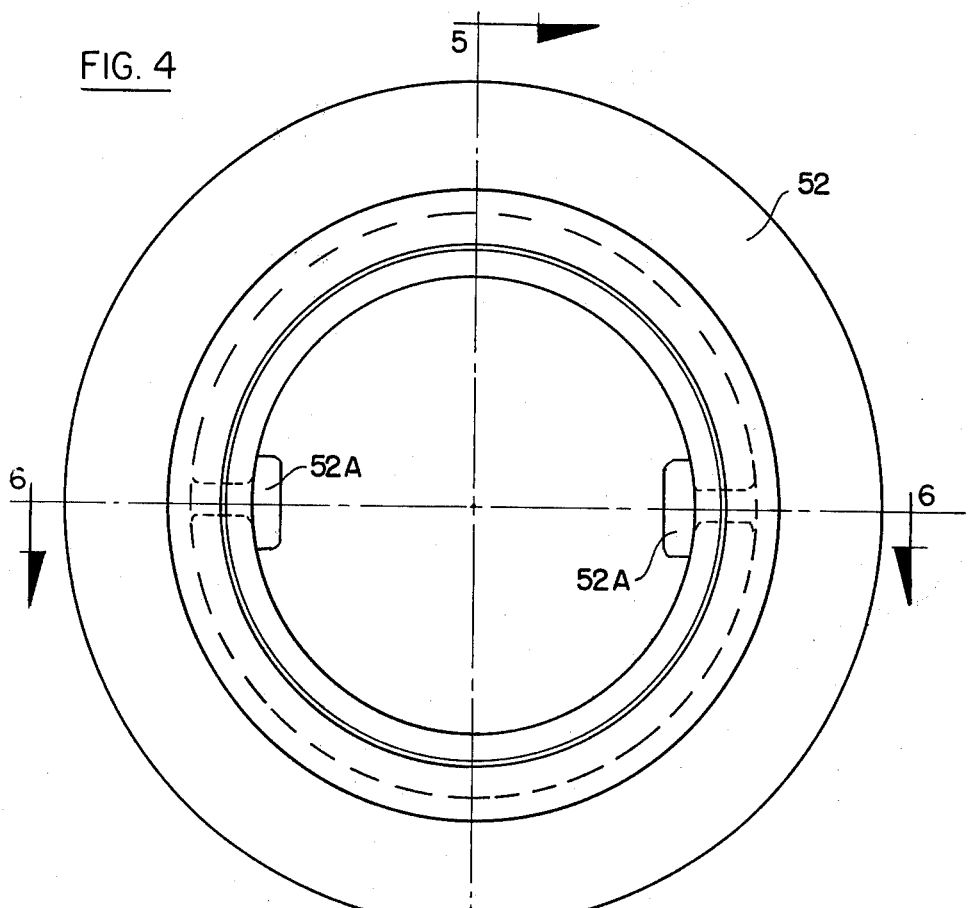
FIG. 4 is a plan view of a resilient ring which also is used in the assembly of FIG. 1.
Figure 5:
FIGS. 5 and 6 are sections of the resilient ring of FIG. 4, taken along the lines 5—5 and 6—6 respectively.
Figure 6:
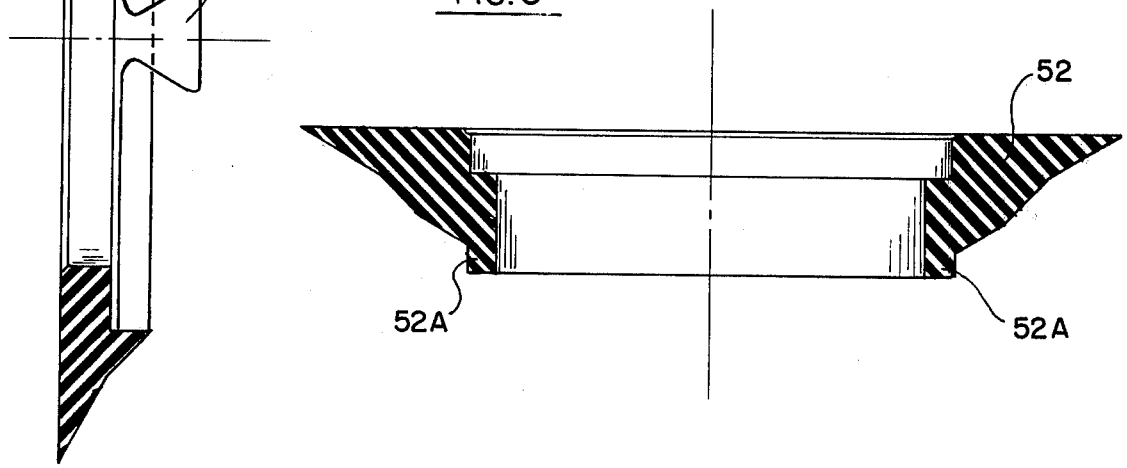

The retaining elements include a retaining ring 50 which, as shown in FIGS. 2 and 3 is formed of a pair of arcuate segments, and which is shaped to fit coaxially around the tubular valve housing 20 against the shoulder formed by the flange 20A, and to engage the inner surface of the shell 10 around the lip of its mouth. With the retainer ring 50 in place, it is evident that the possibility of the valve housing 20 being ejected through the liquid port is eliminated. The mouth of shell 10 is sealed by a resilient ring 52 which is shaped, as shown in FIGS. 4–6 to be fitted over the outer peripheral surface of the flange 20A in coaxial relationship with the valve assembly, and to engage the inner surface of the shell 10.

The resilient ring 52 is held assembled on the retaining ring 50 by means of a plurality of wedge-shaped, radially-inwardly extending segments 52A which fit between the segments forming the retaining ring 50. The resilient ring 52 may be formed, for example, of Buna "N" synthetic rubber of a hardness factor of 60 Durometer, or other appropriate material.

The retaining assembly is held in place by a lock nut 54 which is threaded to the tubular housing 20, and which engages a collar 56 which, in turn, engages an O-ring seal 58, the O-ring being interposed between the collar and the retaining ring 50, with an appropriate washer 60 being interposed between the O-ring and the retaining ring.

In assembling the valve assembly into the port 14, the resilient ring 52 is folded over and inserted into the port, together with the segments forming the retaining ring 50. The tubular valve housing 20 and its internal components, which previously were inserted into the shell, are then pulled into engagement with the retaining ring 50 and resilient ring 52, as shown in FIG. 1. The washer 60, O-ring 58 and collar 56 are then mounted into their illustrated positions, and the entire assembly is locked in place by the lock nut 54.

The invention provides, therefore, retaining means for a pressure accumulator, whereby easy assembly and disassembly of the poppet valve assembly into or out of the liquid port is provided, without any possibility of the valve assembly being ejected from the port during normal operation of the pressure accumulator, but which will release the pressure from the interior of the shell in the presence of abnormally high pressures to oviate any likelihood that the shell itself will burst.

While a particular embodiment of the invention has been shown and described, modifications may be made. It is intended in the claims to cover the modifications which come within the spirit and scope of the invention.

What is claimed is:

1. In a pressure accumulator including a rigid shell having an opening at one end thereof, a valve assembly mounted in the opening comprising: a tubular housing having an outer diameter less than the diameter of the opening and having a peripheral shoulder formed at the inner end thereof whose outer diameter is less than the diameter of the opening; a retaining ring formed of a plurality of arcuate segments mounted coaxially around the tubular housing and configured to engage said peripheral shoulder and also to engage the inner surface of the shell surrounding the opening; a resilient ring mounted concentrically around the inner end of the tubular housing and having an outer peripheral surface engaging the inner surface of the shell surrounding the opening, and said resilient ring further having a plurality of wedge-like portions, each extending radially inwardly with increasing transverse dimensions between the segments forming said retaining ring to constitute a mounting means for the resilient ring on the retaining ring.

2. The combination defined in claim 1, and which includes an O-ring seal mounted in said opening coaxially around the tubular housing adjacent to the retaining ring; a collar mounted in said opening coaxially around the tubular housing and engaging the O-ring; and a lock nut coaxially threaded to the tubular housing and engaging the collar to mount the valve assembly in the opening in said rigid shell.

* * * * *